July 13, 1943.　　　G. A. THOMPSON　　　2,324,336
INDICATING APPARATUS
Filed Feb. 17, 1940　　　7 Sheets-Sheet 1

Inventor
George A. Thompson
By Clarence A. O'Brien
and Hyman Berman
Attorneys

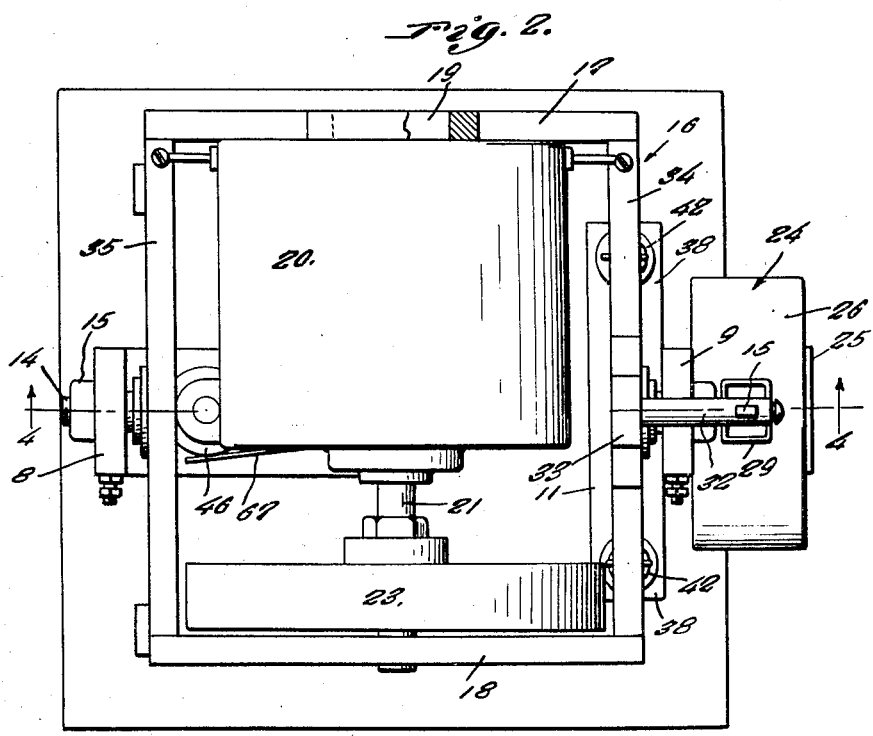

July 13, 1943.                G. A. THOMPSON                2,324,336
                              INDICATING APPARATUS
                    Filed Feb. 17, 1940          7 Sheets-Sheet 3
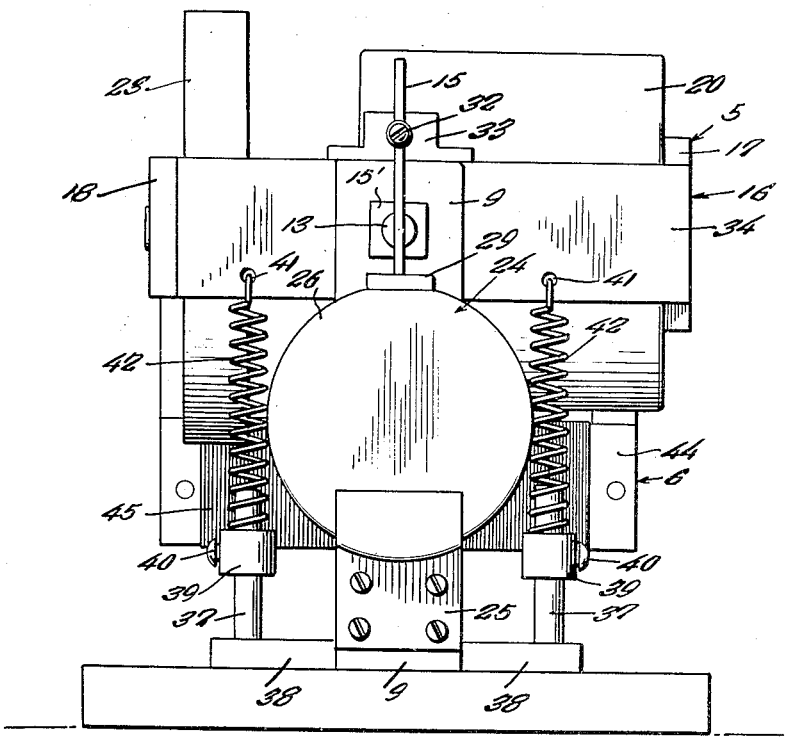
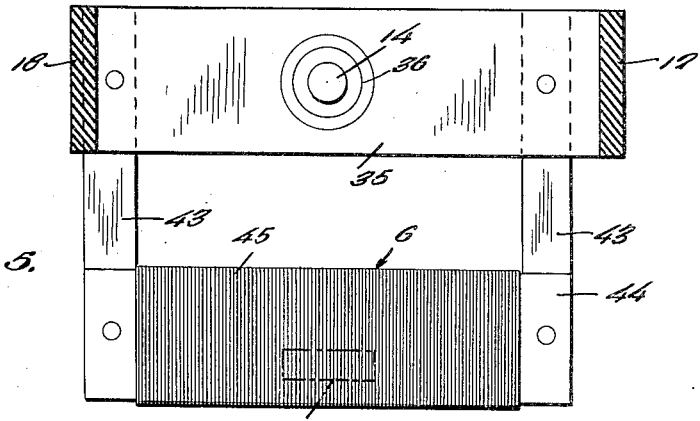
Inventor
George A. Thompson
By Clarence A. O'Brien
and Hyman Berman
Attorneys July 13, 1943.  G. A. THOMPSON  2,324,336
INDICATING APPARATUS
Filed Feb. 17, 1940   7 Sheets-Sheet 4

Inventor
George A. Thompson
By Clarence A. O'Brien
and Hyman Berman
Attorneys

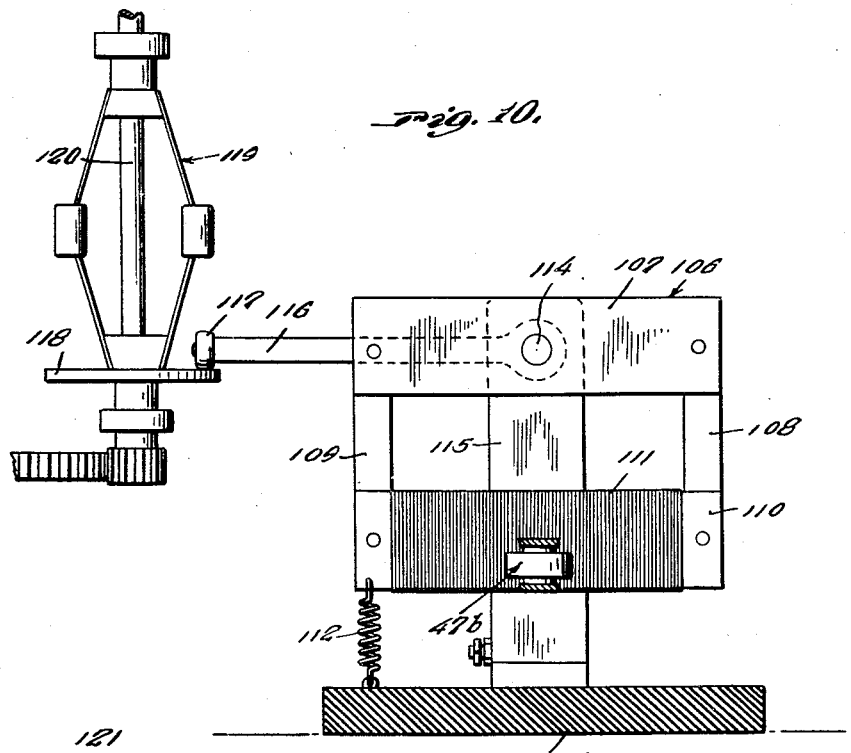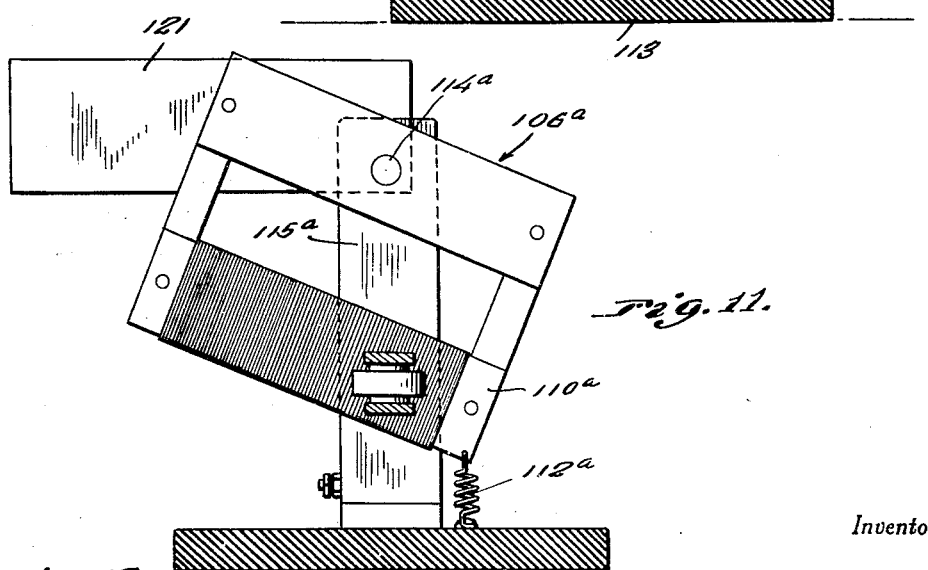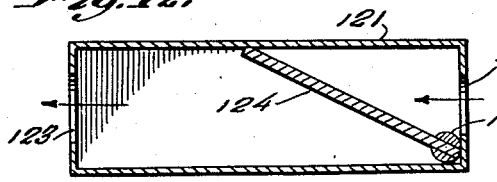

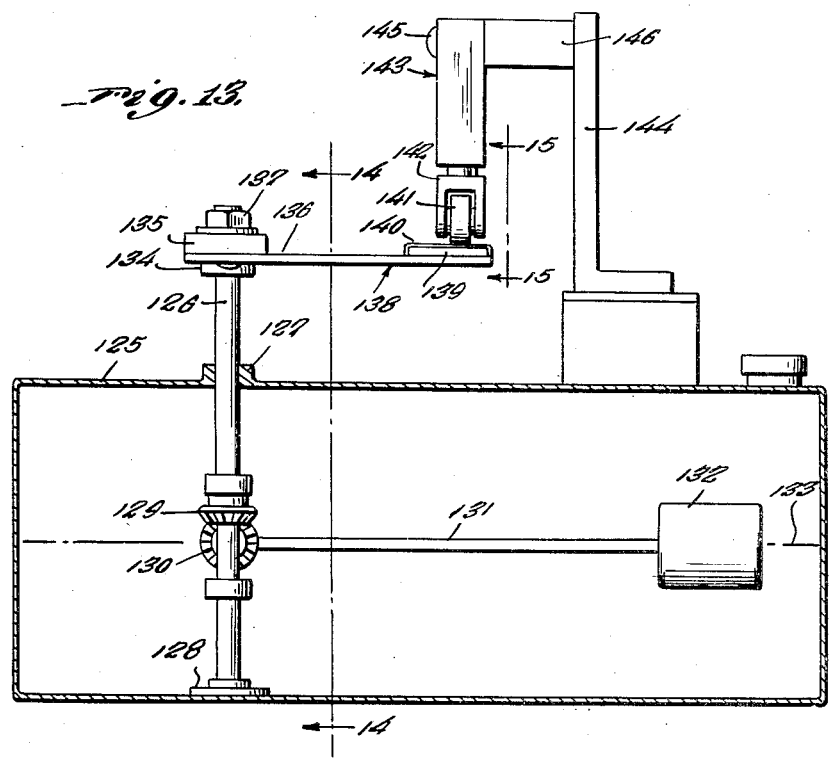
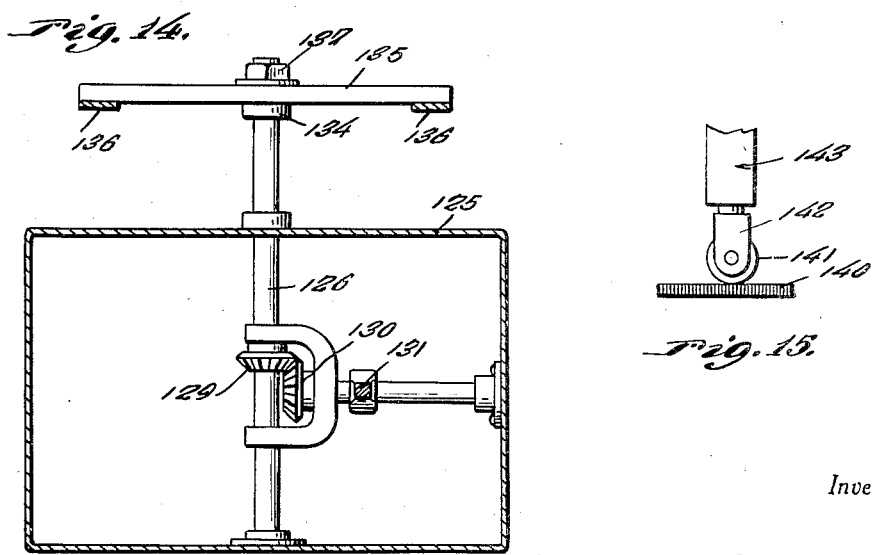

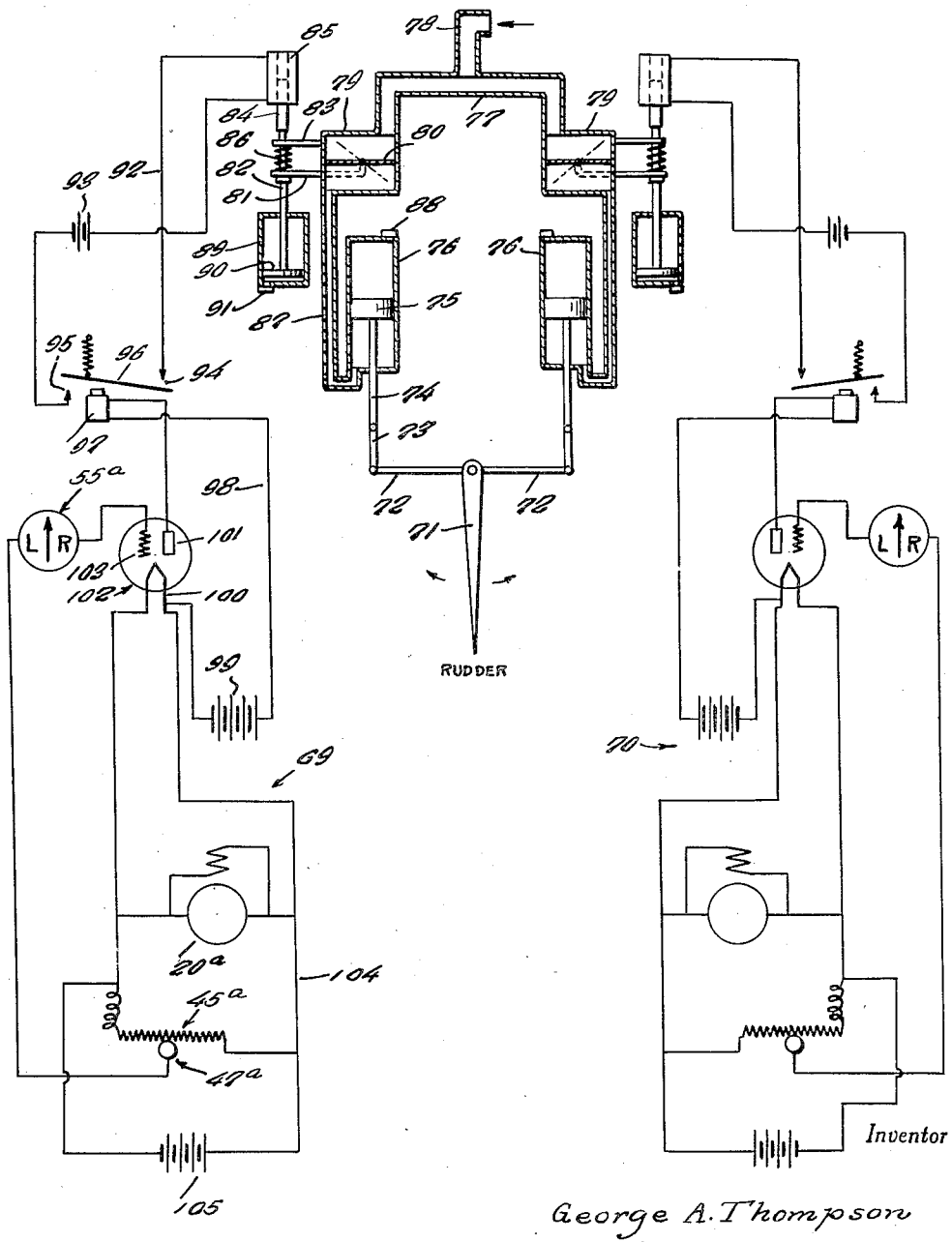

Patented July 13, 1943

2,324,336

UNITED STATES PATENT OFFICE 2,324,336

INDICATING APPARATUS

George A. Thompson, Dravosburg, Pa.

Application February 17, 1940, Serial No. 319,531

3 Claims. (Cl. 201—48)

This invention appertains to new and useful improvements in indicating apparatus and more particularly to the improvements on my Patent No. 2,120,771, issued June 14, 1938, for Electric level indicator. The present invention relates more particularly to indicators of the type employing an electric indicator such as a milliammeter in conjunction with an automatically controlled rheostat.

The principal object of the present invention is to provide an indicator wherein an electric resistor is employed in conjunction with an automatic controller, wherein the parts while being of stable and durable construction are operative in a freely and wear-compensating manner, to the end that the apparatus will be substantially fool-proof in operation and not susceptible to the requirement of frequent repairs or replacements.

Another important object of the invention is to provide an indicator involving an automatically controlled rheostat in conjunction with an electric indicating instrument, and further in conjunction with a gyroscope, constructed and arranged in such a manner that the instrument will respond to and indicate any angular change of position of the gyroscope movable frame, such as would be due to precession.

Another important object of the invention is to provide an electric indicating apparatus of the character described wherein a gyroscope is employed to counteract centrifugal force, which force formerly interfered with the pendulous motion.

Still another important object of the invention is to provide an indicating apparatus of the character stated employing a gyroscope driven by an electric motor wherein the current to the motor is supplied through the bearings upon which the weight of the motor and gyrowheel are supported.

A further object of the invention is to provide an indicating apparatus of the character described employing a gyroscope and a resistor, and further wherein, the voltage drop across any portion of said resistor is placed under measurement, or is determined by means of a contactor against which the resistor is adapted to ride, the contactor supplying the various electrical values received therefrom, to a suitably calibrated meter.

These and numerous other important objects and advantages of the invention will become apparent to the reader of the following specification.

In the drawings—

Figure 2 is a top plan view of the apparatus shown in Figure 1.

Figure 3 is a side elevational view of the structure shown in Figure 2.

Figure 4 is a vertical sectional view taken substantially on the line 4—4 of Figure 2.

Figure 5 is a sectional view taken substantially on the line 5—5 of Figure 4.

Figure 6 is an elevational view of one of the insulation frame sides.

Figure 7 is a detailed sectional view of the resistor and the contactor therefor.

Figure 8 is a section on the line 8—8 of Figure 7.

Figure 9 is a diagrammatic view showing the resistor, motor, gyro-frame and other electrical element electrically connected.

Figure 10 is a fragmentary detailed sectional view showing a modified form of resistor driven by a governor.

Figure 11 is a fragmentary detailed sectional view showing a modified form of resistor driven by wind responsive means.

Figure 12 is a detailed sectional view through the wind tunnel of the structure shown in Figure 11.

Figure 13 is a fragmentary detailed sectional view through still another form of the invention especially adapted for indicating the level of liquid.

Figure 14 is a section on the line 14—14 of Figure 13.

Figure 15 is a fragmentary side elevational view taken from the position 15—15 of Figure 13.

Figure 16 is a diagrammatic view showing a dual system for automatically controlling the rudder of an aircraft or marine-craft for maintaining the said craft on a given force.

Figure 1:
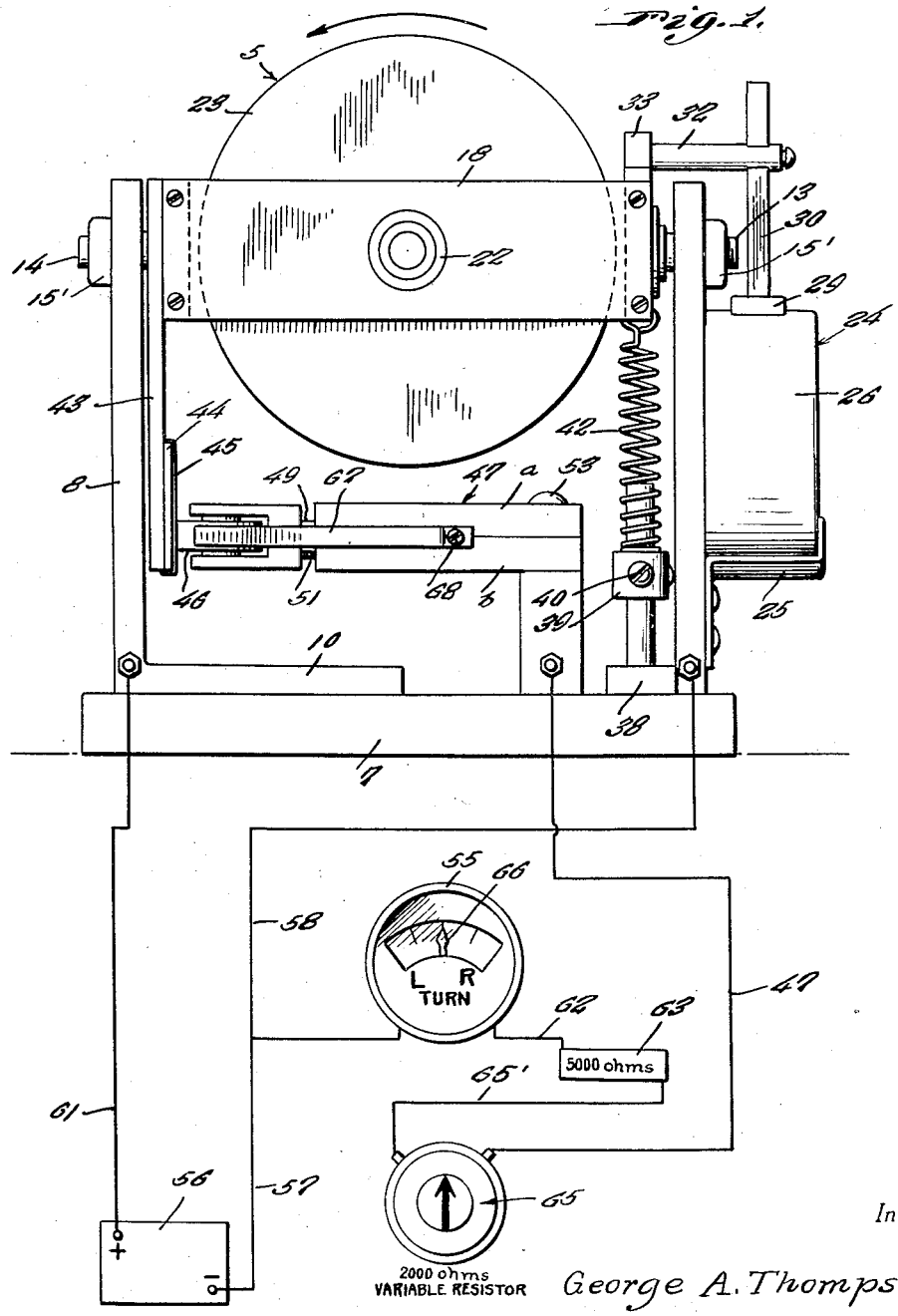
Figure 1 represents a front elevational view of the gyro-resistor apparatus shown in conjunction with a diagram disclosing associated elements.

Referring to Figures 1, 2, 3, 4 and 5, it can be seen that the gyro apparatus is generally referred to by numeral 5 and the resistor apparatus is generally referred to by numeral 6. This is all mounted upon the base 7 of insulation which is permanently or fixedly attached to the craft on which the apparatus is to be mounted.

A pair of L-shaped posts 8 and 9 have their feet portions 10 and 11 respectively secured to the base 7 by screws 12.

Trunnion pins 13—14 extend inwardly from the upper end portions of the posts 8 and 9, the outer ends of these pins being threaded to accommodate nuts 15 for holding the pins definitely in position for supporting the gyro-frame 16.

This frame 16 consists of the side members 17 and 18 of some suitable insulation, the frame side 17 being formed with a square opening 19 to receive the square boss of the gyro motor 20. The armature shaft 21 of the motor 20 extends through a bearing 22 in the frame side member 18 and between the motor 20 and the frame side 18, the armature shaft 21 carries the gyro wheel 23 which, of course, is in the nature of a heavy flywheel.

For damping the motion of the gyro frame 16 and ironing out any vibrations that may occur therein, a damping unit generally referred to by numeral 24 is employed. This damping unit consists of a bracket 25 supporting the receptacle 26 in which is a suitable light oil or other liquid 27 in which the paddle 28 is free to oscillate. The top of the receptacle 26 has the upstanding open neck 29 through which the stem 30 of the paddle 28 extends and this can be packed against loss of oil. This stem being preferably square is cross section and extending through the square opening 31 in the outer end portion of the pin 32 which projects from the raised structure 33 on the side member 34 of the aforementioned frame 16. This side member 34 being opposed to and in parallel relation with the side member 35 and both of these side members 34 and 35 are of current conductive material.

It will be observed that the trunnion pins 13 and 14 extend into the ball-bearing assemblies 36 which are embedded in the side members 34 and 35 of the frame 16.

A pair of cylindrical posts 37—37 arise from the wing portions 38 of the foot portion 11 of the post 9 and each has a collar 39 thereon which can be held in any desired position on the corresponding post 39 by a set screw 40.

End portions of the side member 34 of the frame 16 are formed with openings 41 through which the upper ends of the tensioned springs 42 are hooked or otherwise disposed. The lower ends of these springs 42—42 extend over the upper ends of the post 37 and are attached to the adjustable collars 39 as suggested in Figure 3. These springs 42—42 serve to steady the frame and prevent any motion thereof that would be counteractive to the operation of the gyroscope.

Figure 5 clearly shows the resistor assembly generally referred to by numeral 6, this consisting of the pair of leg member 43—43 depending from the side member 35. The strip 44 of suitable insulation has the resistance wire 45 coiled thereon to provide a flat coil against which the contact roller 46 of the contactor generally referred to by numeral 46 is capable of riding, it being understood at this time, that the resistor 6 actually moves against the contactor 47, the contactor 47 being fixed to the base 7.

The contactor 47 consists in construction of a barrel 48 divided longitudinally into an upper section *a* and a lower section *b*. The plunger 49 operates longitudinally in the barrel and against the compression spring 50 which, of course, serves to maintain the plunger 49 moved outwardly and the roller 46 forced against the coil 45. The lower section *b* of the barrel 48 is internally grooved as at 51 to receive the key of the plunger 49, this key being denoted by numeral 52.

Obviously this key 52 and groove 51 prevent rotation of the plunger 49 in the barrel 48.

The barrel 48 is held in a parallel position with respect to the base 7 by means of the pin 53 which extends downwardly through one end of the barrel and is threadedly disposed into the base 7, a spacer sleeve 54 being provided on the pin 53 to properly space the barrel 48 from the base 7, so that the roller 46 will be in the proper contacting relation with the resistor coil 45.

Figure 9 clearly shows the circuits employed in conjunction with the apparatus aforedescribed.

In Figure 9, numeral 55 denotes a milliammeter type electric instrument which is calibrated for "left" and "right" turning of an aircraft. Numeral 56 represents the source of electricity which has the lead 57 to one side of the instrument 55 and also by way of the jumper 58 to the post 9. The post 9 is of current conductive material and directly contacting the frame member 34 and the latter, in turn, is connected by the jumper 59 to the motor 20, the other side of the motor 20 being connected by the jumper 60 to the frame member 35 which is in electric connection with the post 8 by way of the corresponding trunnion pin 14. The return side of the battery 56 is denoted by numeral 61. Extending from the remaining side of the instrument 55 is the jumper 62 which connects to one side of the fixed resistance 63 (approximately 5000 ohms) and from the other side of this resistance 63 extends the jumper 64 to the variable resistor generally referred to by numeral 65. The variable resistor 65 is, in turn, connected to the contactor 47 which includes the roller 46.

Obviously, when an aircraft equipped with the apparatus aforedescribed turns in one direction, the apparatus will tilt and the frame 16 will assume a corresponding compensatory position with the result that the resistor coil 45 has been moved to a position with one end closer to the roller 46 than the other resulting in a corresponding divergence of the indicator member of the instrument 55 from zero position, and as the instrument is calibrated this will read either to the "right" or to the "left." Obviously the amount of movement of the indicating hand 66 of the instrument 55 will depend upon the turn of the aircraft and the setting of the variable resistor 65, limits of the number of degrees of turn of the aircraft to the "right" or to the "left" per unit of time, of course, being reasonably comparative with the limits of movement of the indicator hand 66 to the "right" or "left," but, of course, this can be accurately regulated by the variable resistor 65.

To minimize fluctuating currents of extremely small value which appear to originate in the roller contactor due to imperfect contact between balls and ball races, said fluctuations giving an unsteady milliammeter reading, a strip spring 67 is secured on the contactor 47 with one end anchored as at 68 and the other end, that is, the free end bearing against the periphery of the roller 46.

Obviously, the aforedescribed apparatus can be used in a dual system for controlling the flight of an aircraft, or in fact maintaining any vessel, either an aircraft or a marine-craft on an even predetermined course. In this connection attention is invited to Figure 16. The system illustrated in Figure 16 is divided into the left phase generally referred to by numeral 69 and the right phase generally referred to by numeral 70. Assuming that the rudder of the craft is denoted by numeral 71 and that the same has the laterally disposed arms 72—72. The ends of these arms 72—72 are connected by links or other means 73 and the connecting rods 74 to pistons 75 in the cylinders 76—76.

Numeral 77 represents an air pressure manifold having the intake pipe 78. Each end of this manifold 77 connects to the valve box 79 in which a butterfly valve 80 is operative. Each of these butterfly valves 80 is controlled by a lever 81 through which a rod 82 is operative. Each of these rods 82 may also operate through a guide 83 extending from the adjacent box 79 and each rod 82 extends from the movable core 84 of the corresponding electro-magnet 85. Interposed between each arm 81 and the corresponding guide 83 is a compression spring 86.

Extending from each valve box 79 is a duct 87 which communicates with the rear end of the corresponding cylinder 76. The forward end of each cylinder 76 is provided with a check valve 88, to permit the escape of air as the corresponding piston 75 moves forwardly.

As is apparent in Figure 16, the rod 82 extends into a dashpot 89 wherein is a piston 90 attached to the rod. The bottom of the dashpot 89 is equipped with an escape or relief valve 91.

Each of the two phases 69 and 70 of the system are identical in arrangement. As can be seen in Figure 16, the solenoid 85 of the phase 69 is in the circuit 92 with the battery 93 and this circuit is interrupted by the contacts 94 and 95 and the armature 96 of the relay coil 97. The relay coil 97 is in the circuit 98 with the battery 99, the filament 100 and plate 101 of the amplifier tube 102. The indicating instrument 55a corresponding to the instrument 55 shown in Figure 9, is interposed between the grid 103 of the amplifying tube 102 and the contactor 47a of the variable resistor assembly 45a. The circuit 104 includes the battery 105, the filament 100 and the motor 20a and resistor 45a connected in parallel therewith.

It is to be granted that each of the resistors 45a is controlled by a gyro apparatus such as is disclosed in Figures 1, 2, 3 and 4 of the drawings. When these gyro apparatuses are affected, obviously, the resistance of the circuit 104 is changed to the end that the relay 97 of either one or the other of the phases 69 or 70 is energized, attracting the corresponding armature 96. This action is indicated and to the desired degree of angularity of deviation from the said course of the vessel on the instrument 55a. When the armature 96 bridges the contacts 94 and 95, the circuit 92 becomes closed resulting in the energization of the solenoid 85. This results in the attraction of the core 84 and the opening of the valve 80 to the end that air from the manifold 77 passes through the valve box 79 and duct 87 to the cylinder 76 and acting on the corresponding piston 75 moves the rudder 71 to the desired position to restore the course of the vessel to that predetermined.

Obviously, various adaptations of the variable resistor can be resorted to and some modifications are shown in Figures 10, 11 and 13.

Figure 10 shows resistor 106 which consists of the beam member 107 having the depending leg members 108 and 109 bridged at their lower ends by the strip 110 on which the resistor coil 111 is wound. One end of this strip 110 is connected by the stabilizing spring 112 to the base 113, the latter being of insulation. Reference character 47b denotes the roller of a contact assembly corresponding to the contact assembly 47, as shown in Figure 1. The beam 107 is carried by the shaft 114 which is journaled through the upper portion of the post 115 and which has the arm 116 extending laterally therefrom and equipped with a roller 117 riding the travel plate 118 of a governor mechanism generally referred to by numeral 119. Obviously, travel of the plate 118 on the governor shaft 120 will result in a swinging action of the arm 116 and a corresponding tilting action of the resistor 106 with a relative differential between the coil 111 and the contactor roller 47b.

In the form of the invention shown in Figure 11, the spring 112a may be changed to the other end of the resistor coil strip 110a. The resistor assembly generally referred to by reference numeral 106a in this form of the invention is carried by the shaft 114a extending through the post 115a. Numeral 121 represents a wind tunnel having the inlet opening 122 at one end and the outlet 123 at its opposite end. In the tunnel 121 which is preferably mounted in a stationary manner is the wind responsive vane 124 carried by the shaft 114a, the latter extending into the forward end of the tunnel 121. Obviously, as wind pressure affects the vane 124, the shaft 114a is rotated and correspondingly the resistor 106a is tilted to an extent comparative to the movement of the vane 124.

A further adaptation of the resistor is shown in Figures 13, 14 and 15 and in this adaptation, the resistor is particularly utilized for indicating the level of liquid in a tank. In this last form of the invention, the tank is denoted by reference character 125 and the same has the shaft 126 extending downwardly through the bearing 127 in the top of the tank and into the bearing 128 on the bottom of the tank. On this shaft 126 is the beveled gear 129 meshing with the bevel gear 130 from which extends the elongated stem 131 carrying the float 132 riding the surface 133 of the liquid in the tank 125. At the upper portion of the shaft 126 is the shoulder 134 on which rests the beam 135 from which projects the legs 136—136. The beam 135 is held in place on the shaft 126 by the nut 137. Further construction of the resistor which is generally referred to by numeral 138 consists of the strip of insulation 139 bridging the legs 136—136 and the resistor coil 140 wound thereon. This resistor 138 is adapted to ride back and forth depending upon the rotation of the shaft 126 by the float 122, under and against the roller 141 which is mounted in the yoke 142 of the contactor unit generally referred to by numeral 143 and which is secured to the upright 144 by a bolt 145 passing through the spacer 146, the latter properly spacing the contactor from the post.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A resistor comprising a support, a carrier, pivotal connecting means between the carrier and the supporting means, a resistance element disposed on the carrier and means for damping the action of the carrier, a contactor in wiping relation with the resistance, said damping means consisting of a container having an open top, a paddle depending into the receptacle, a volume of fluid in the receptacle into which a portion of the paddle is disposed, and an arm responsive to the action of the carrier and to which the paddle is secured.

2. A resistor comprising a support, a carrier, pivotal connecting means between the carrier and the supporting means, a resistance element disposed on the carrier and means for damping the action of the carrier, a contactor in wiping relation with the resistance, said damping means consisting of a container having an open top, a paddle depending into the receptacle, a volume of fluid in the receptacle into which a portion of the paddle is disposed, and an arm responsive to the action of the carrier and to which the paddle is secured, said arm having an opening therein, said paddle having a shank adjustably disposed through the opening of the arm.

3. A control apparatus of the character described comprising a base, a bracket on the base, a gyro unit including a frame, said frame being rockably supported on said bracket, a member depending from the frame, a resistance element on the depending member, a riser on the base, a horizontally disposed arm, a contact carried by the arm and riding the said resistance, a container supported by the base, an arm projecting laterally from the frame, and a paddle depending from the arm and into the container, said container being provided with a volume of liquid.

GEORGE A. THOMPSON.